(12) United States Patent
Suzuki

(10) Patent No.: US 9,158,432 B2
(45) Date of Patent: Oct. 13, 2015

(54) REGION RECOMMENDATION DEVICE, REGION RECOMMENDATION METHOD AND RECORDING MEDIUM

(75) Inventor: Shunsuke Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 181 days.

(21) Appl. No.: 13/700,934

(22) PCT Filed: Apr. 15, 2011

(86) PCT No.: PCT/JP2011/059884
§ 371 (c)(1),
(2), (4) Date: Nov. 29, 2012

(87) PCT Pub. No.: WO2011/152149
PCT Pub. Date: Dec. 8, 2011

(65) Prior Publication Data
US 2013/0080974 A1    Mar. 28, 2013

(30) Foreign Application Priority Data

Jun. 3, 2010   (JP) ................... 2010-127512

(51) Int. Cl.
*G06F 3/0482* (2013.01)
*G06F 3/01* (2006.01)
*G06F 3/0488* (2013.01)

(52) U.S. Cl.
CPC ............. *G06F 3/0482* (2013.01); *G06F 3/013* (2013.01); *G06F 3/0488* (2013.01); *G06F 3/04886* (2013.01)

(58) Field of Classification Search
CPC ................ H04M 1/72586; G06F 3/0482
USPC ............................................. 715/811
See application file for complete search history.

(56) References Cited

U.S. PATENT DOCUMENTS

| | | | |
|---|---|---|---|
| 7,970,664 B2 * | 6/2011 | Linden et al. ............ | 705/26.7 |
| 8,229,915 B1 * | 7/2012 | Lloyd et al. ............. | 707/709 |
| 2002/0080188 A1 * | 6/2002 | Somashekaraiah ....... | 345/810 |
| 2005/0246651 A1 * | 11/2005 | Krzanowski ............. | 715/770 |
| 2007/0067744 A1 * | 3/2007 | Lane et al. ............. | 715/860 |
| 2008/0141149 A1 * | 6/2008 | Yee et al. ............. | 715/764 |
| 2009/0037253 A1 * | 2/2009 | Davidow et al. ......... | 705/10 |

(Continued)

FOREIGN PATENT DOCUMENTS

| | | |
|---|---|---|
| JP | 2000-099236 A | 4/2000 |
| JP | 2002-132412 A | 5/2002 |

(Continued)

OTHER PUBLICATIONS

Dictionary.com Unabridged, "besides." Accessed: Dec. 14, 2014, Random House, Inc., http://dictionary.reference.com/browse/besides.*

*Primary Examiner* — Reza Nabi
*Assistant Examiner* — Daniel Rodriguez
(74) *Attorney, Agent, or Firm* — Sughrue Mion, PLLC

(57) ABSTRACT

A region recommendation device 100 includes a visibility analysis unit 101 which identifies a region where a viewing order satisfies a set criterion as a frequent viewing region, a selection possibility analysis unit 102 which identifies a object which the selection possibility satisfies a set criterion as a frequent selection object, and a recommended-region identification unit 103 which recommends a suitable region from among regions besides the region in which the placed frequent selection object in the frequent viewing region.

7 Claims, 14 Drawing Sheets

(56) References Cited

U.S. PATENT DOCUMENTS

| | | | |
|---|---|---|---|
| 2009/0125841 A1* | 5/2009 | Yamashita | 715/810 |
| 2009/0265243 A1* | 10/2009 | Karassner et al. | 705/14.54 |
| 2009/0306959 A1* | 12/2009 | Rappoport et al. | 704/2 |
| 2010/0153544 A1* | 6/2010 | Krassner et al. | 709/224 |
| 2010/0153836 A1* | 6/2010 | Krassner et al. | 715/234 |
| 2010/0191727 A1* | 7/2010 | Malik | 707/734 |
| 2011/0202493 A1* | 8/2011 | Li | 706/50 |
| 2011/0202821 A1* | 8/2011 | Roy et al. | 715/201 |
| 2011/0206283 A1* | 8/2011 | Quarfordt et al. | 382/220 |
| 2011/0258581 A1* | 10/2011 | Hu | 715/811 |

FOREIGN PATENT DOCUMENTS

| | | |
|---|---|---|
| JP | 2007-316783 A | 12/2007 |
| JP | 4059666 B2 | 3/2008 |
| JP | 2008-278252 A | 11/2008 |
| JP | 2009-251142 A | 10/2009 |

* cited by examiner

Fig.9

VIEWING ORDER INFORMATION

| OBJECT ID | AVERAGE VIEWING RANK |
|---|---|
| A | 1. 83 |
| B | 2. 96 |
| C | 4. 65 |
| D | 4. 03 |
| E | 5. 22 |
| F | 5. 67 |
| G | 6. 01 |
| H | 7. 43 |
| I | 7. 88 |

Fig.12

| OBJECT ID | SELECTION FREQUENCY |
|---|---|
| A | 2 |
| B | 6 |
| C | 10 |
| ⋮ | ⋮ |
| I | 2 |

US 9,158,432 B2

REGION RECOMMENDATION DEVICE, REGION RECOMMENDATION METHOD AND RECORDING MEDIUM

CROSS REFERENCE TO RELATED APPLICATIONS

This application is a National Stage of International Application No. PCT/JP2011/059884 filed Apr. 15, 2011, claiming priority based on Japanese Patent Application No. 2010-127512, filed Jun. 3, 2010, the contents of all of which are incorporated herein by reference in their entirety.

TECHNICAL FIELD

The present invention relates to a region recommendation device, a region recommendation method and a recording medium which recommend the most suitable region when placing an object on a screen.

BACKGROUND ART

First, an "object" and a "region" which are terminology used in this specification will be described. In this specification, the "region" means an area on a display screen. The "object" is a part of the "region". In particular, the "region" means the area which can be selected by selection operation (such as click of a mouse, for example) performed by a user using an input device. Specifically, as an example of the "object", the region in which a text provided with a link is placed, the region in which a button is placed or the like in Graphical User Interface are mentioned.

In the field of computers, it has been a mainstream to use Graphical User Interface (hereinafter, referred to as "GUI (Graphical User Interface)") for an operation screen. In recent years, in the field of not only the computers but also the electronic devices such as a cellular phone, a digital camera or the like, it has been a mainstream to use a menu screen or the like using the GUI.

And, in the GUI, for improvement of usability, various evaluation systems which evaluate usability of the GUI and show a result of the analysis are proposed. As one of such evaluation systems, there is a system which acquires visibility information of an operator of the GUI by eye tracking analysis, and evaluates based on the acquired visibility information. In the eye tracking analysis, a movement of operator's pupil is detected with an infrared sensor, and a viewing position and its order are acquired as the visibility information.

By utilizing such an evaluation system using the eye tracking analysis, a designer of the GUI can analyze earliness and order of viewing for an object which should be selected by an operator for achieving a certain task (hereinafter, referred to as "selection target object"). And, based on a result of the analysis, the designer can obtain a guideline which says, in order that the selection target object is selected more certainly, "a position of the selection target object should be moved from the present position to the position to be viewed earlier". The designer moves the position of the selection target object based on this guideline, and achieves improvement of usability of the GUI.

A system for achieving improvement of usability of the GUI is also proposed (refer to patent documents 1-3). The system disclosed by patent documents 1-3 acquires an operation history of the operator, and performs positioning change of the object on the screen based on the acquired operation history. The system disclosed by patent documents 1-3 is not a system to evaluate the GUI. However, by utilizing this system, the operator can easily operate the object which is frequently selected. Therefore, the usability improvement of the GUI is achieved by utilizing this system.

PRIOR ART DOCUMENTS

Patent Documents

Patent document 1: Japanese Patent Application Publication No. 2000-99236
Patent document 2: Japanese Patent Application Publication No. 2007-316783
Patent document 3: Japanese Patent No. 4059666

SUMMARY OF THE INVENTION

Problem to be Solved by the Invention

By the way, in order to achieve further improvement of usability of the GUI, it needs to improve a probability that the operator selects the selection target object certainly. In other words, in order to achieve further improvement of usability of the GUI, the selection target object needs to be placed at a position including a high possibility to be selected by the operator (hereinafter, referred to as "selection possibility").

However, although the above-mentioned evaluation system can show a viewing position of the operator and its order, it cannot identify a position including a high possibility to be selected by the operator from among positions including early viewing orders. For this reason, in the above-mentioned evaluation system, it is difficult that the designer places the selection target object at the position including a high selection possibility. In other words, in the above-mentioned evaluation system, further improvement of the usability is difficult. The above-mentioned point will be described in detail below.

First, it is supposed that there is an object other than the selection target object which has been frequently selected by mistake on the screen. At this time, even if the selection target object has been moved, if the movement destination is the position which is corresponding to the viewing order later than the viewing order of the object used to be selected by mistake, the following problem occurs. That is, it is remain unchanged that the object used to be selected by mistake is still easily selected. Accordingly, in this case, it cannot be said that the selection target object has been moved to the position where the selection possibility is effectively improved, and further improvement of the usability is difficult.

For example, it assumes a case where a task of "alarm setting" is performed on a cellular phone. FIG. 14 is a figure showing an example of a menu screen of the cellular phone in related art. The menu screen shown in FIG. 14 is a screen indicated during a process of the task of "alarm setting". In FIG. 14, rectangles of A-I indicate buttons being indicated. The region partitioned by each rectangle represents a placing position of each button. Moreover, the character arranged in the rectangular center of A-I is a name of the button.

In a state while the menu screen shown in FIG. 14 is being indicated, the operator needs to select a "clock" button on the menu screen in case where the above-mentioned task is performed. And, by the above-mentioned evaluation system, it is supposed that alphabetical order (A, B, C, . . . I) is identified as the viewing order of each button on the menu screen shown in FIG. 14.

The designer obtains a guide line that in order for the operator to visually recognize a "clock" button early and select this more certainly, the "clock" button should be moved to any one of positions of the rectangles A-G of which the viewing order is earlier than the current position of the rectangle H. Then, it is supposed that the designer has moved the placing position of the "clock" button to, for example, the position of the rectangle E according to this guideline.

On the other hand, although a "setting" button is a button which should not be selected originally, it is supposed that a certain operator misunderstands the "setting" button can set an alarm by selecting this button, and frequently selects this button by mistake. Moreover, as shown in FIG. 14, it is supposed that the "setting" button is placed at the position including earlier viewing order than the position of the rectangle E even if it is after having moved the position of the "clock" button.

In this case, because the "setting" button is visually recognized earlier than the "clock" button even if the "clock" button has been moved to the position of the rectangle E, the "setting" button which has been selected by mistake up to now remains still easily to be selected. That is, in such case, even if the "clock" button has been moved to the position of E, its selection possibility is not raised effectively, and further improvement of the usability will become a difficult state.

The system disclosed by patent documents 1-3 acquires the operation history of the operator as mentioned above. Therefore, the button which the operator frequently has selected by mistake is judged as an object including high priority order. From this, further improvement of the usability is difficult even if the system disclosed by patent documents 1-3 is used.

An example of an object of the present invention is to provide a region recommendation device, a region recommendation method and a recording medium which can solve the above-mentioned problem, identify a position on the screen where it is highly likely that an operator selects an object, and achieve improvement of usability of the GUI.

Solution to Problem

A region recommendation device in one aspect of the present invention includes, a visibility analysis unit which identifies, based on viewing order of a region on a screen, from among regions besides the region in which a target object is placed, the region where the viewing order satisfies a set criterion as a frequent viewing region, a selection possibility analysis unit which identifies, based on selection possibility of each object on the screen, from among objects placed on the frequent viewing region, the object which the selection possibility satisfies a set criterion as a frequent selection object, and a recommended-region identification unit which identifies, based on the viewing order, from among regions besides the region in which the frequent selection object is placed in the frequent viewing region, the region which is suitable for placing the target object as a recommended-region.

Further, a region recommendation method in one aspect of the present invention, identifying, based on viewing order of a region on a screen, from among regions besides the region in which a target object is placed, the region where the viewing order satisfies a set criterion as a frequent viewing region, identifying, based on selection possibility of each object on the screen, from among objects placed on the frequent viewing region, the object which the selection possibility satisfies a set criterion as a frequent selection object, and identifying, based on the viewing order, from among regions besides the region in which the frequent selection object is placed in the frequent viewing region, the region which is suitable for placing the target object as a recommended-region.

Also, a recording medium in one aspect of the present invention records a program for causing a computer to perform, processing for identifying, based on viewing order of a region on a screen, from among regions besides the region in which a target object is placed, the region where the viewing order satisfies a set criterion as a frequent viewing region, processing for identifying, based on selection possibility of each object on the screen, from among objects placed on the frequent viewing region, the object which the selection possibility satisfies a set criterion as a frequent selection object, and processing for identifying, based on the viewing order, from among regions besides the region in which the frequent selection object is placed in the frequent viewing region, the region which is suitable for placing the target object as a recommended-region.

Advantageous Effect of the Invention

The region recommendation device, the region recommendation method and the recording medium according to the present invention can identify, on the screen, a position where it is highly likely that an operator selects an object, and achieve improvement of usability of the GUI.

BRIEF DESCRIPTION OF THE DRAWINGS

FIG. 9 indicates an example of the viewing order information used in the embodiment 1.

FIG. 12 indicates a selection frequency for each object measured in an embodiment 2.

DESCRIPTION OF EMBODIMENTS (First Exemplary Embodiment)

Figure 1:
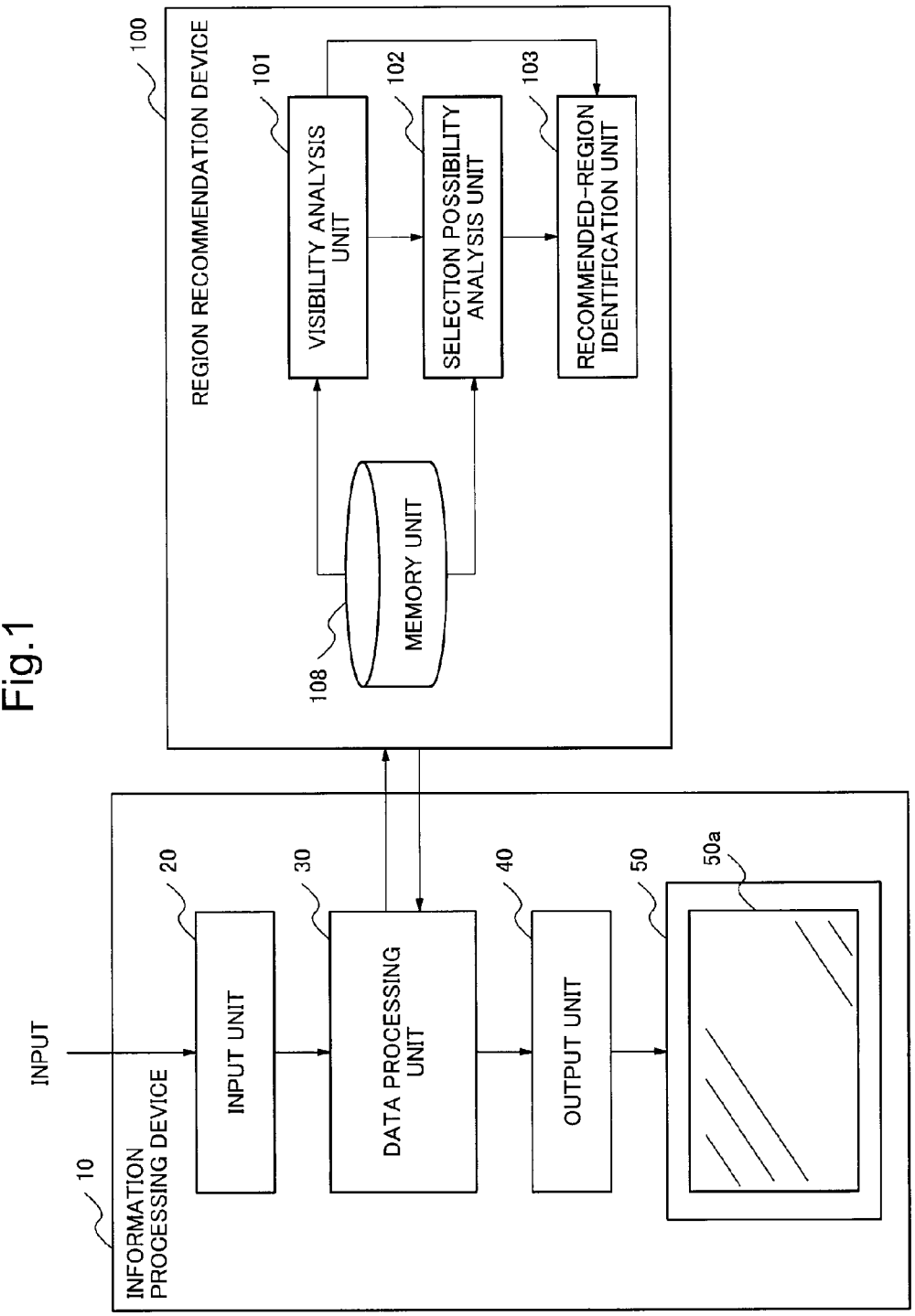
FIG. 1 is a block diagram showing a configuration of the region recommendation device according to a first exemplary embodiment of the present invention.

Hereinafter, a region recommendation device, a region recommendation method, a program and a recording medium according to a first exemplary embodiment of the present invention will be described with reference to FIG. 1 and FIG. 2. First, a configuration of the region recommendation device according to the first exemplary embodiment will be described using FIG. 1. FIG. 1 is a block diagram showing the configuration of the region recommendation device according to the first exemplary embodiment of the present invention.

The region recommendation device 100 according to the first exemplary embodiment shown in FIG. 1 is connected to an information processing device 10. The region recommendation device 100 recommends a region which is suitable for placing an object on a screen of the GUI provided by the information processing device 10. Further, the information processing device 10 is a device which performs various tasks in response to an input from outside, and the GUI is adopted as an operation screen. As a specific example of the information processing device 10, a computer, a mobile terminal, a digital camera, other electronic devices are mentioned.

As shown in FIG. 1, the information processing device 10 includes an input unit 20, a data processing unit 30, an output unit 40 and a display device 50. The input unit 20 is an input device such as a keyboard, a touch panel, a track-ball or a track-pad. An operator can perform operation such as selection of an object displayed on a screen 50a of the display device 50 via the input unit 20.

When the operator selects an object (see below FIG. 3) on the screen 50a via the input unit 20, the data processing unit 30 performs a task which is associated with the selected object. Specifically, the data processing unit 30 is configured by a CPU (Central Processing Unit). In this case, when the CPU reads a program for performing a selected task and executes the read program, the data processing unit 30 is configured. And, the task is executed in the data processing unit 30.

Also, the data processing unit 30 outputs data to the output unit 40 for displaying various screens such as an operation screen of the GUI and a screen for showing an execution result of the task. The output unit 40 generates image data based on data from the data processing unit 30 and outputs this to the display device 50.

For example, if the information processing device 10 is a cellular phone, the information processing device executes the tasks about a call and an e-mail processing, a picture processing, a music file processing or the like.

Further, as shown in FIG. 1, the region recommendation device 100 includes a visibility analysis unit 101, a selection possibility analysis unit 102, a recommended-region identification unit 103 and a memory unit 108. The visibility analysis unit 101 identifies, based on order to be visually recognized for a region on the screen 50a (hereinafter, referred to as "viewing order"), from among regions besides the region in which a target object is placed, the region where the viewing order satisfies a set criterion as a frequent viewing region.

Here, the "target object" is an object to be a target of being identified as a recommended-region. That is, the "target object" is the object which should be selected for achieving a task (hereinafter, referred to as "selection target object"). The "viewing order" is found by the rank of each region at the time when the screen 50a is actually visually recognized by an operator from outside, or by a predicted rank of each region or the like.

Further, according to the first exemplary embodiment, the memory unit 108 stores information for identifying the viewing order in advance (hereinafter, referred to as "viewing order information"). The visibility analysis unit 101 takes out the viewing order information from the memory unit 108, and identifies a frequent viewing region using the viewing order information having been taken out.

The selection possibility analysis unit 102 identifies, based on a possibility to be selected of each object on the screen (hereinafter, referred to as "selection possibility"), from among objects placed on the frequent viewing region, the object which the selection possibility satisfies a set criterion as a frequent selection object. The "selection possibility" is found by a selection history of the object by an operator, a relation between a text shown to the object and a task associated with the object, or a predicted selection probability for each object or the like.

Further, according to the first exemplary embodiment, the memory unit 108 also stores information for identifying the selection possibility for each object in advance (hereinafter, referred to as "selection possibility information"). The selection possibility analysis unit 102 takes out the selection possibility information for each object from the memory unit 108, and identifies a frequent selection object using the selection possibility information having been taken out.

The recommended-region identification unit 103 identifies, based on the viewing order, from among regions besides the region in which the frequent selection object is placed in the frequent viewing region, the region which is suitable for placing the selection target object as a recommended-region. And, information which identifies the recommended-region (hereinafter, referred to as "recommended-region information") is outputted from the region recommendation device 100 to the data processing unit 30 of the information processing device 10. After that, the data processing unit 30 reassembles an operation screen of the GUI using the recommended-region information.

Thus, because the region recommendation device 100 can identify, on the screen 50a provided by the information processing device 10, a position where it is highly likely that an operator selects an object, it will be able to achieve improvement of usability of the GUI of the information processing device 10.

Figure 2:
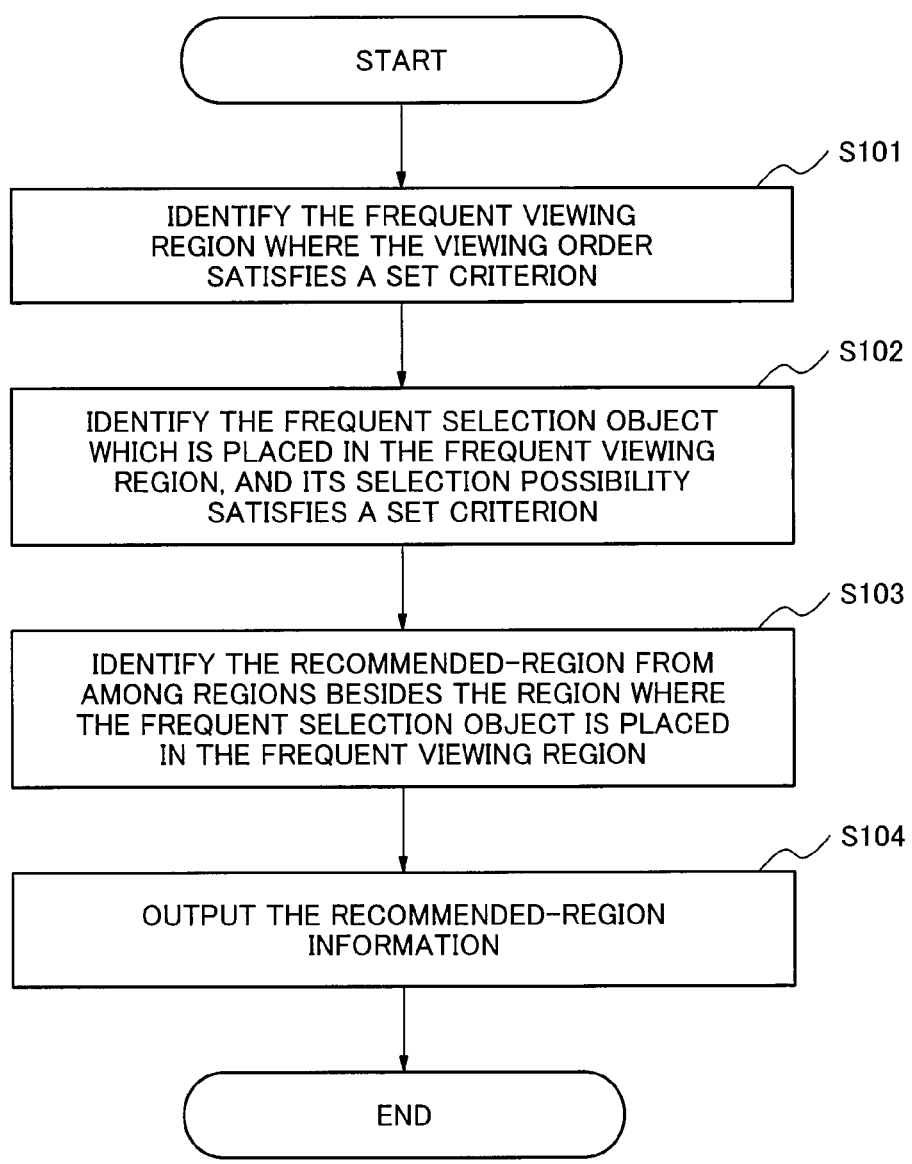
FIG. 2 is a flow chart showing operation of the region recommendation device according to the first exemplary embodiment of the present invention.

Next, operation of the region recommendation device 100 according to the first exemplary embodiment will be specifically described using FIG. 2. FIG. 2 is a flow chart showing operation of the region recommendation device 100 according to the first exemplary embodiment of the present invention. In the following description, FIG. 1 is considered appropriately. Further, according to the first exemplary embodiment, a region recommendation method is performed by operating the region recommendation device 100. Therefore, the description of region recommendation method according to the first exemplary embodiment is substituted by the following operation description of the region recommendation device 100.

As shown in FIG. 2, first, the visibility analysis unit 101 acquires the viewing order information from the memory unit 108. And, the visibility analysis unit 101 identifies, based on the viewing order identified by the viewing order information, from among regions besides the region in which the selection target object is placed, the region where the viewing order satisfies a set criterion (the frequent viewing region) (Step S101).

According to the first exemplary embodiment, as the set criterion of the viewing order in Step S101, the criterion whether the viewing order is earlier than the selection target object can be adopted. In this case, the visibility analysis unit 101 identifies the region where the viewing order is earlier than the selection target object as the frequent viewing region from among regions besides the region in which the selection target object is placed.

Further, according to the first exemplary embodiment, whenever the screen is viewed by the operator, the region recommendation device 100 detects viewing rank of each of a plurality of parts which compose the screen, and can find the viewing order based on the detected viewing rank of each part. Specifically, the region recommendation device 100 finds average viewing rank for each part, and can compose the viewing order by each average viewing rank having been found. Moreover, the region recommendation device 100 can also find the viewing order based on the viewing rank which is predicted for each of the plurality of parts which compose the screen. By the way, as the plurality of parts which compose the screen, each of the objects placed on the screen is mentioned.

Next, the selection possibility analysis unit 102 acquires the selection possibility information of each object on the screen from the memory unit 108. And, the selection possibility analysis unit 102 identifies, based on the selection possibility identified from the selection possibility information, from among objects placed on the frequent viewing region, the object which the selection possibility satisfies a set criterion (the frequent selection object) (Step S102).

According to the first exemplary embodiment, as the set criterion of the selection possibility in Step S102, the criterion, whether the selection possibility is higher than the selection target object, can be adopted. In this case, the selection possibility analysis unit 102 identifies the object which has a higher selection possibility than the selection target object as the frequent selection object.

Further, according to the first exemplary embodiment, the selection possibility of each object on the screen can be found, for example, based on a ratio of the number of times the object having been selected to the number of times the screen having been viewed. Moreover, the selection possibility of each object on the screen can be found based on the semantic relation between the contents of the task associated with the object and the text shown to the object.

Next, the recommended-region identification unit 103 identifies, based on the viewing order information acquired from the memory unit 108 in Step S101, from among regions besides the region in which the frequent selection object is placed in the frequent viewing region, the region which is suitable for placing the selection target object (the recommended-region) (Step S103).

According to the first exemplary embodiment, the recommended-region identification unit 103 can identify the recommended-region based on, for example, similar to the visibility analysis unit 101, whether the viewing order is earlier than the selection target object. That is, the recommended-region identification unit 103 can identify the region where the viewing order is earlier than the frequent selection object in the frequent viewing region as the recommended-region.

Further, according to the first exemplary embodiment, it is desirable that the recommended-region identification unit 103 identifies a plurality of recommended-regions or the recommended-region which includes a plurality of positions capable of placing the object. This is because the placing position of the object is needed to be determined by considering elements besides the viewing order such as a custom and the relation with the surrounding object, and even if only a single position is recommended, actually, it may not necessarily be able to place the object in its position.

After that, the recommended-region identification unit 103 outputs the recommended-region information which indicates the recommended-region identified in Step S103 to the data processing unit 30 of the information processing device 10 (Step S104). The processing in the region recommendation device 100 ends by execution of Step S104. After that, in the information processing device 10, for example, the operation screen of the GUI is reassembled.

Further, according to the first exemplary embodiment, the frequent viewing region identified in Step S101 and the recommended-region identified in Step S103 are not just regions, but it maybe be the object itself. That is, this frequent viewing region and the recommended-region may be an object besides the selection target object or a region in which the object is placed. In this case, the information processing device 10 replaces a position of the selection target object with a position of a different object and reassembles the operation screen of the GUI.

Further, according to the first exemplary embodiment, it is desirable to adopt "Is the viewing order early whether or not" as the criterion in Steps S101 and S103, and to adopt "Is the selection possibility high whether or not" as the criterion in Step S102 as mentioned above. In this case, the region which improves the selection possibility effectively is narrowed down from the region which is visually recognized earlier than the current position of the selection target object by the operator for achieving a task, and the narrowed down region will be identified as the recommended-region.

Moreover, a program according to the first exemplary embodiment may be a program which when executed by a computer, causes the computer to perform Steps S101-S104 shown in FIG. 2. By this program being installed in the computer and executed, the region recommendation device 100 and the region recommendation method according to the first exemplary embodiment are realized. In this case, a CPU of the computer functions as the visibility analysis unit 101, the selection possibility analysis unit 102 and the recommended-region identification unit 103, and performs the processing. Moreover, a memory device, a memory or the like of the computer functions as the memory unit 108. Moreover, a recording medium which records the program according to the first exemplary embodiment maybe a recording medium in which the above-mentioned program is recorded.

(Second Exemplary Embodiment)

Figure 3:
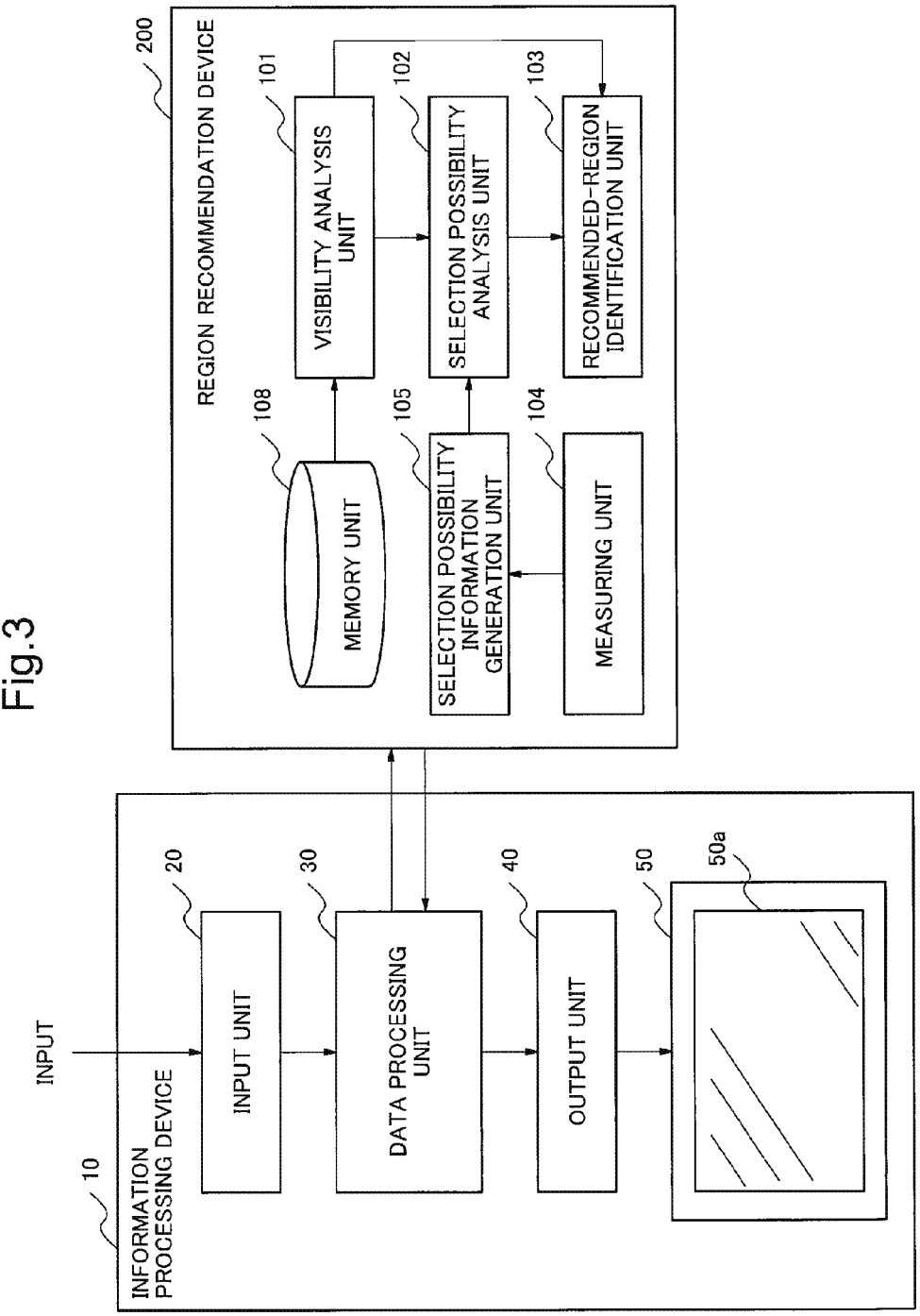
FIG. 3 is a block diagram showing a configuration of the region recommendation device according to a second exemplary embodiment of the present invention.

Next, a region recommendation device, a region recommendation method and a recording medium according to a second exemplary embodiment of the present invention will be described with reference to FIG. 1 and FIG. 2. First, a configuration of the region recommendation device according to the second exemplary embodiment will be described using FIG. 3. FIG. 3 is a block diagram showing the configuration of the region recommendation device according to the second exemplary embodiment of the present invention.

As shown in FIG. 3, according to the second exemplary embodiment, a region recommendation device 200 is different from the region recommendation device 100 according to the first exemplary embodiment, and further includes a measuring unit 104 and a selection possibility information generation unit 105. Further, the region recommendation device 200 is configured similar to the region recommendation device 100 according to the first exemplary embodiment with respect to a point except this. Hereinafter, description will be made focusing on a different point from the first exemplary embodiment.

The measuring unit 104 measures the number of times which an operator has viewed the screen 50*a* of the display device 50 (hereinafter, referred to as "the viewing number of times") and the number of times which the object of each object on the screen has been selected (hereinafter, referred to as "selection frequency").

The selection possibility information generation unit 105 performs the statistical processing to the viewing number of times and the selection frequency for each object that the measuring unit 104 has measured, and generates the selection possibility information for each object based on a result of the statistical processing.

Thus, according to the second exemplary embodiment, by the measuring unit 104 and the selection possibility information generation unit 105, the selection possibility information of each object is generated. And, the selection possibility analysis unit 102 identifies the frequent selection object using the generated selection possibility information.

Figure 4:
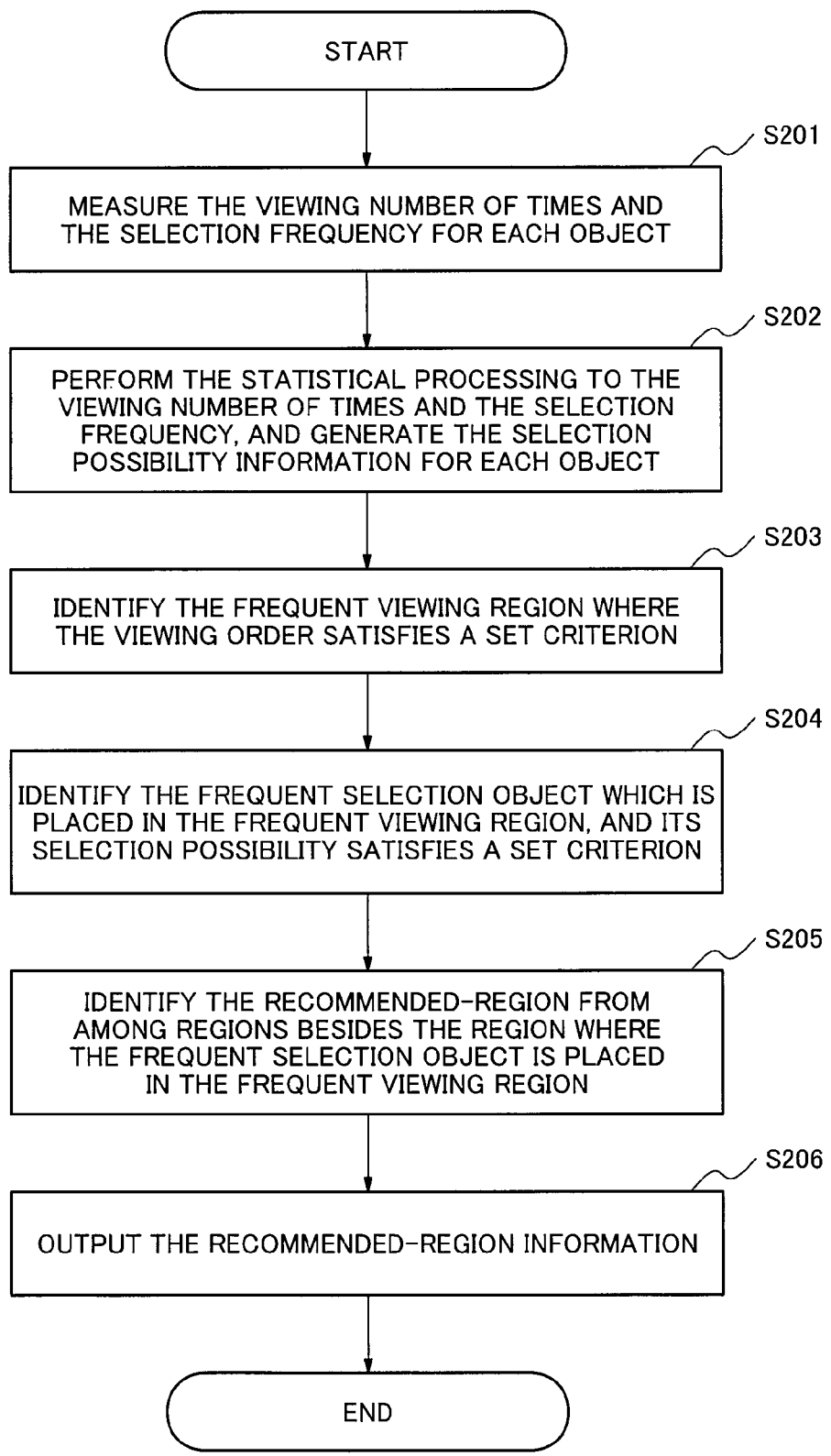
FIG. 4 is a flow chart showing operation of the region recommendation device according to the second exemplary embodiment of the present invention.

Next, operation of the region recommendation device 200 according to the second exemplary embodiment will be specifically described using FIG. 4. FIG. 4 is a flow chart showing operation of the region recommendation device 200 according to the second exemplary embodiment of the present invention. In the following description, FIG. 3 is considered appropriately. Further, according to the second exemplary embodiment, a region recommendation method is performed by operating the region recommendation device 200. Therefore, the description of region recommendation method according to the second exemplary embodiment is substituted by the following operation description of the region recommendation device 200.

As shown in FIG. 4, first, the measuring unit 104 measures the viewing number of times and the selection frequency for each object on the screen (Step S201). According to the second exemplary embodiment, the measuring unit 104 accesses the data processing unit 30 of the information processing device 10, and carries out Step S201 repeatedly until region recommendation for the selection target object is found.

Next, the selection possibility information generation unit 105 performs the statistical processing to the viewing number of times and the selection frequency for each object measured in Step S201, and generates the selection possibility information for each object based on a result of the statistical processing (Step S202).

Specifically, for example, the selection possibility information generation unit 105 finds, for each object, a ratio of the selection frequency of the object to the viewing number of times, and can make the found ratio the selection possibility information.

Next, the visibility analysis unit 101 acquires the viewing order information from the memory unit 108, and identifies the frequent viewing region based on the viewing order which is identified from the acquired viewing order information (Step S203). Step S203 is the same step as Step S101 shown in FIG. 2 in the first exemplary embodiment.

Next, the selection possibility analysis unit 102 identifies the frequent selection object based on the selection possibility information generated in Step S202 (Step S204). Step S204 is the same step as Step S102 shown in FIG. 2 in the first exemplary embodiment except for a point that the selection possibility information generated in Step S202 is used.

Next, the recommended-region identification unit 103 identifies, based on the viewing order information acquired from the memory unit 108 in Step S203, from among regions besides the region in which the frequent selection object is placed in the frequent viewing region, the region which is suitable for placing the selection target object (recommended-region) (Step S205). Step S205 is the same step as Step S103 shown in FIG. 2 in the first exemplary embodiment.

After that, the recommended-region identification unit 103 outputs the recommended-region (recommended-region information) identified in Step S205 to the data processing unit 30 of the information processing device 10 (Step S206). Step S206 is the same step as Step S104 shown in FIG. 2 in the first exemplary embodiment. The processing in the region recommendation device 200 ends by execution of Step S206.

After that, in the information processing device 10, for example, the operation screen of the GUI is reassembled.

As above, according to the second exemplary embodiment, the measuring unit 104 and the selection possibility information generation unit 105 can acquire the selection possibility information which indicates the latest selection possibility. And, the selection possibility analysis unit 102 can identify the frequent selection object based on this latest selection possibility information. For this reason, according to the second exemplary embodiment, the recommended-region becomes more appropriate one, and it will be able to achieve further improvement of usability of the GUI of the information processing device 10.

Moreover, a program according to the second exemplary embodiment may be a program which when executed by a computer, causes the computer to perform Steps S201-S206 shown in FIG. 4. By this program being installed in the computer and executed, the region recommendation device 200 and the region recommendation method according to the second exemplary embodiment are realized. Also, in this case, a CPU of the computer functions as the visibility analysis unit 101, the selection possibility analysis unit 102, the recommended-region identification unit 103, the measuring unit 104 and the selection possibility information generation unit 105, and performs the processing. Moreover, a memory device, a memory or the like of the computer functions as the memory unit 108. Moreover, a recording medium which records the program according to the second exemplary embodiment may be a recording medium in which the above-mentioned program is recorded.

(Third Exemplary Embodiment)

Figure 5:
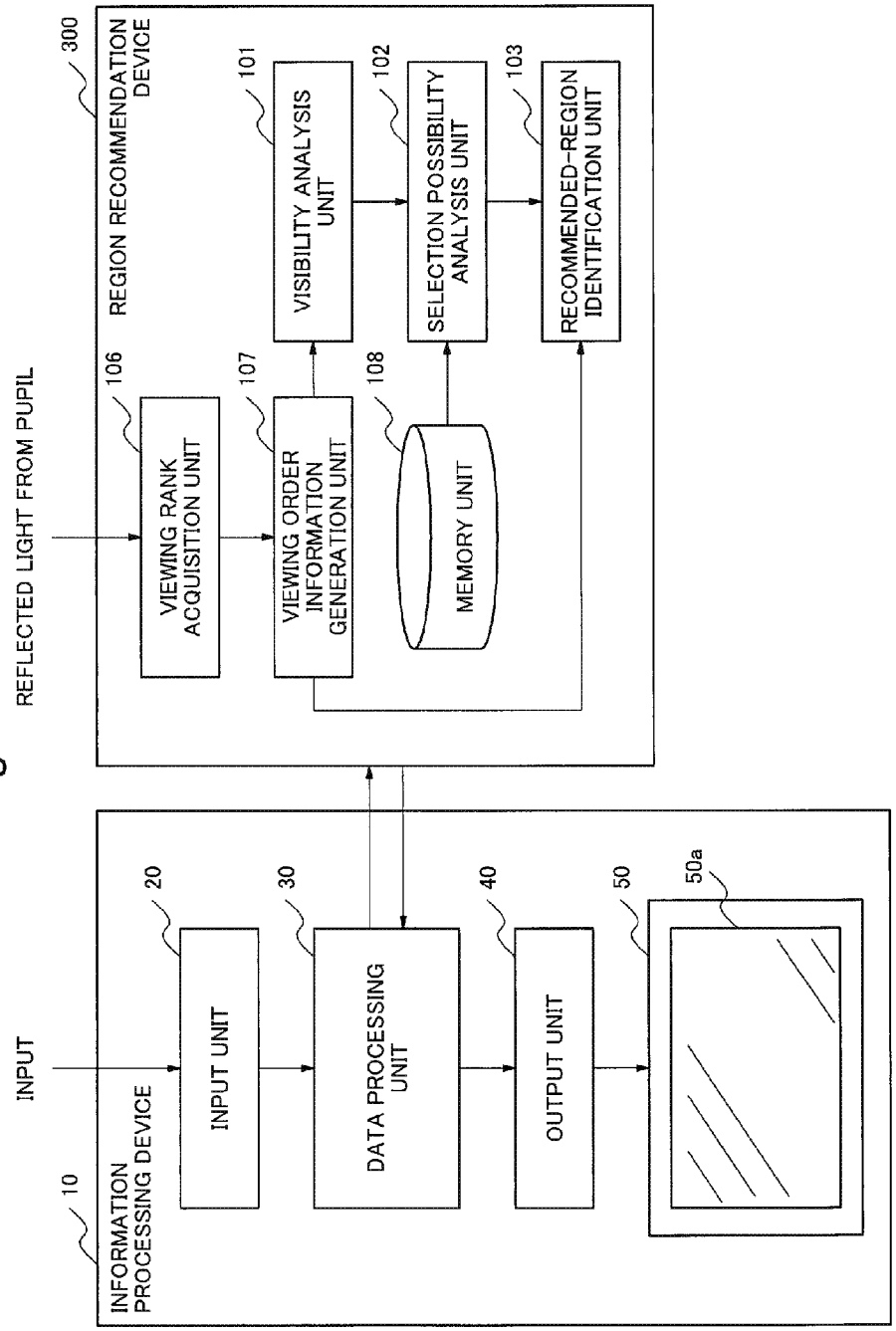
FIG. 5 is a block diagram showing a configuration of the region recommendation device according to a third exemplary embodiment of the present invention.

Next, a region recommendation device, a region recommendation method and a recording medium according to a third exemplary embodiment of the present invention will be described with reference to FIG. 5 and FIG. 6. First, a configuration of the region recommendation device according to the third exemplary embodiment will be described using FIG. 5. FIG. 5 is a block diagram showing the configuration of the region recommendation device according to the third exemplary embodiment of the present invention.

As shown in FIG. 5, according to the third exemplary embodiment, a region recommendation device 300 is different from the region recommendation device 100 according to the first exemplary embodiment, and includes a viewing rank acquisition unit 106 and viewing order information generation unit 107. Further, the region recommendation device 300 is configured similar to the region recommendation device 100 according to the first exemplary embodiment with respect to a point except this. Hereinafter, description will be made focusing on a different point from the first exemplary embodiment.

Whenever the screen 50a is viewed, the viewing rank acquisition unit 106 acquires viewing rank of each object. Specifically, the viewing rank acquisition unit 106 is provided with a device (an eye tracking device) which detects a movement of a pupil by detecting reflected light of the light applied to an operator's pupil. The viewing rank acquisition unit 106 identifies the viewing rank of each object from the movement of operator's pupil.

The viewing order information generation unit 107 performs the statistical processing to the viewing rank of each object which the viewing rank acquisition unit 106 has acquired, and finds the viewing order of a region on the screen based on a result of the statistical processing. Moreover, the viewing order information generation unit 107 generates the viewing order information which specifies the viewing order, and inputs this to the visibility analysis unit 101 and the recommended-region identification unit 103.

Thus, according to the third exemplary embodiment, whenever the screen 50a of the display device 50 is viewed, viewing rank of each object is detected, and the viewing order is found by the viewing rank detected for each object. The visibility analysis unit 101 and the recommended-region identification unit 103 perform processing using the viewing order information which the viewing order information generation unit 107 has generated.

Figure 6:
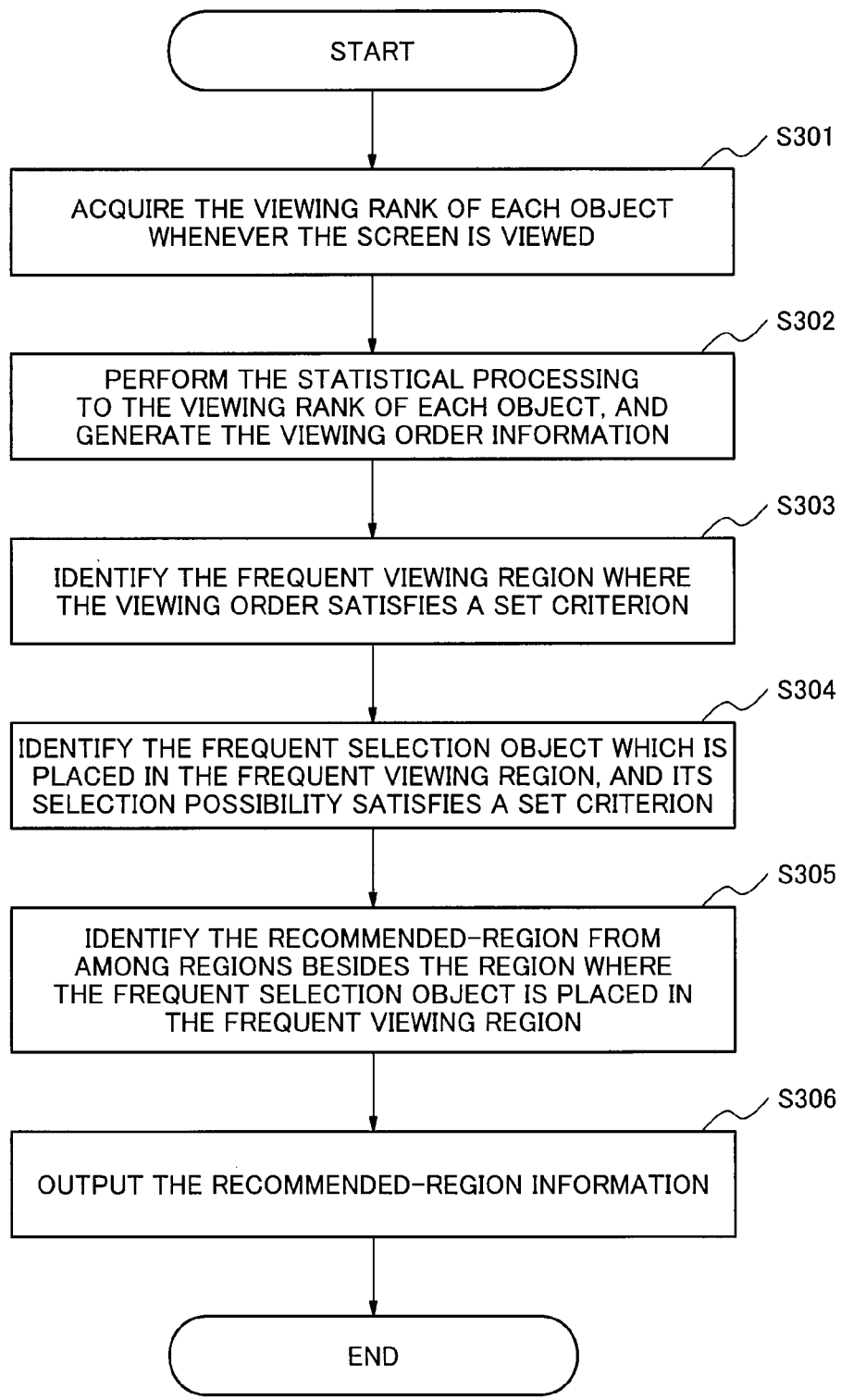
FIG. 6 is a flow chart showing operation of the region recommendation device according to the third exemplary embodiment of the present invention.

Next, operation of the region recommendation device 300 according to the third exemplary embodiment will be specifically described using FIG. 6. FIG. 6 is a flow chart showing operation of the region recommendation device 300 according to the third exemplary embodiment of the present invention. In the following description, FIG. 5 is considered appropriately. Further, according to the third exemplary embodiment, a region recommendation method is performed by operating the region recommendation device 300. Therefore, the description of region recommendation method according to the third exemplary embodiment is substituted by the following operation description of the region recommendation device 300.

As shown in FIG. 6, first, whenever the screen 50a is viewed, the viewing rank acquisition unit 106 acquires the viewing rank of each object (Step S301). Specifically, the viewing rank acquisition unit 106 operates the eye tracking device provided in that and acquires the viewing rank of each object based on a signal from the device. Further, according to the third exemplary embodiment, the viewing rank acquisition unit 106 carries out Step S301 repeatedly until the viewings on the screen of the predetermined number (for example, 100 times or the like) have been completed.

Next, the viewing order information generation unit 107 performs the statistical processing to the viewing rank for each object acquired in Step S301, and generates the viewing order information based on a result of the statistical processing (Step S302). Specifically, in Step S302, the viewing order information generation unit 107 finds, for each object, average viewing rank and configures the viewing order information by the found average viewing order of each object.

Next, the visibility analysis unit 101 identifies the frequent viewing region based on the viewing order information generated in Step S302 (Step S303). Step S303 is the same step as Step S101 shown in FIG. 2 in the first exemplary embodiment except for a point that the viewing order information generated in Step S302 is used.

Next, the selection possibility analysis unit 102 acquires the selection possibility information from the memory unit 108, and identifies the frequent selection object based on the acquired selection possibility information (Step S304). Step S304 is the same step as Step S102 shown in FIG. 2 in the first exemplary embodiment.

Next, the recommended-region identification unit 103 identifies, based on the viewing order information generated in Step S302, from among regions besides the region in which the frequent selection object is placed in the frequent viewing region, the region which is suitable for placing the selection target object (recommended-region) (Step S305). Step S305 is the same step as Step S103 shown in FIG. 2 in the first exemplary embodiment except for a point that the viewing order information generated in Step S302 is used.

After that, the recommended-region identification unit 103 outputs the recommended-region (recommended-region information) identified in Step S305 to the data processing unit 30 of the information processing device 10 (Step S306). Step S306 is the same step as Step S104 shown in FIG. 2 in the first exemplary embodiment. The processing in the region recommendation device 300 ends by execution of Step S306. After that, in the information processing device 10, for example, the operation screen of the GUI is reassembled.

As above, according to the third exemplary embodiment, the viewing rank acquisition unit 106 and the viewing order information generation unit 107 can acquire the viewing order information which indicates the latest viewing order in the region on the screen. And, the visibility analysis unit 101 and the recommended-region identification unit 103 can identify the frequent viewing region and the recommended-region based on this latest viewing order information. For this reason, according to the third exemplary embodiment, the recommended-region becomes more appropriate one, and it will be able to achieve further improvement of usability of the GUI of the information processing device 10.

Moreover, a program according to the third exemplary embodiment may be a program which when executed by a computer, causes the computer to perform Steps S301-S306 shown in FIG. 6. By this program being installed in the computer and executed, the region recommendation device 300 and the region recommendation method according to the third exemplary embodiment are realized. Also, in this case, a CPU of the computer functions as the visibility analysis unit 101, the selection possibility analysis unit 102, the recommended-region identification unit 103, the viewing rank acquisition unit 106 (the part besides the eye tracking device) and the viewing order information generation unit 107, and performs the processing. Moreover, a memory device, a memory or the like of the computer functions as the memory unit 108. Moreover, a recording medium which records the program according to the third exemplary embodiment maybe a recording medium in which the above-mentioned program is recorded.

Although the present invention has been described using the first exemplary embodiment to the third exemplary embodiment as above, the present invention is not limited to these first to third exemplary embodiments. For example, the information processing device of the present invention may be the one which is provided with the measuring unit 104 and the selection possibility information generation unit 105 indicated in the second exemplary embodiment, and the viewing rank acquisition unit 106 and the viewing order information generation unit 107 indicated in the third exemplary embodiment.

Figure 7:
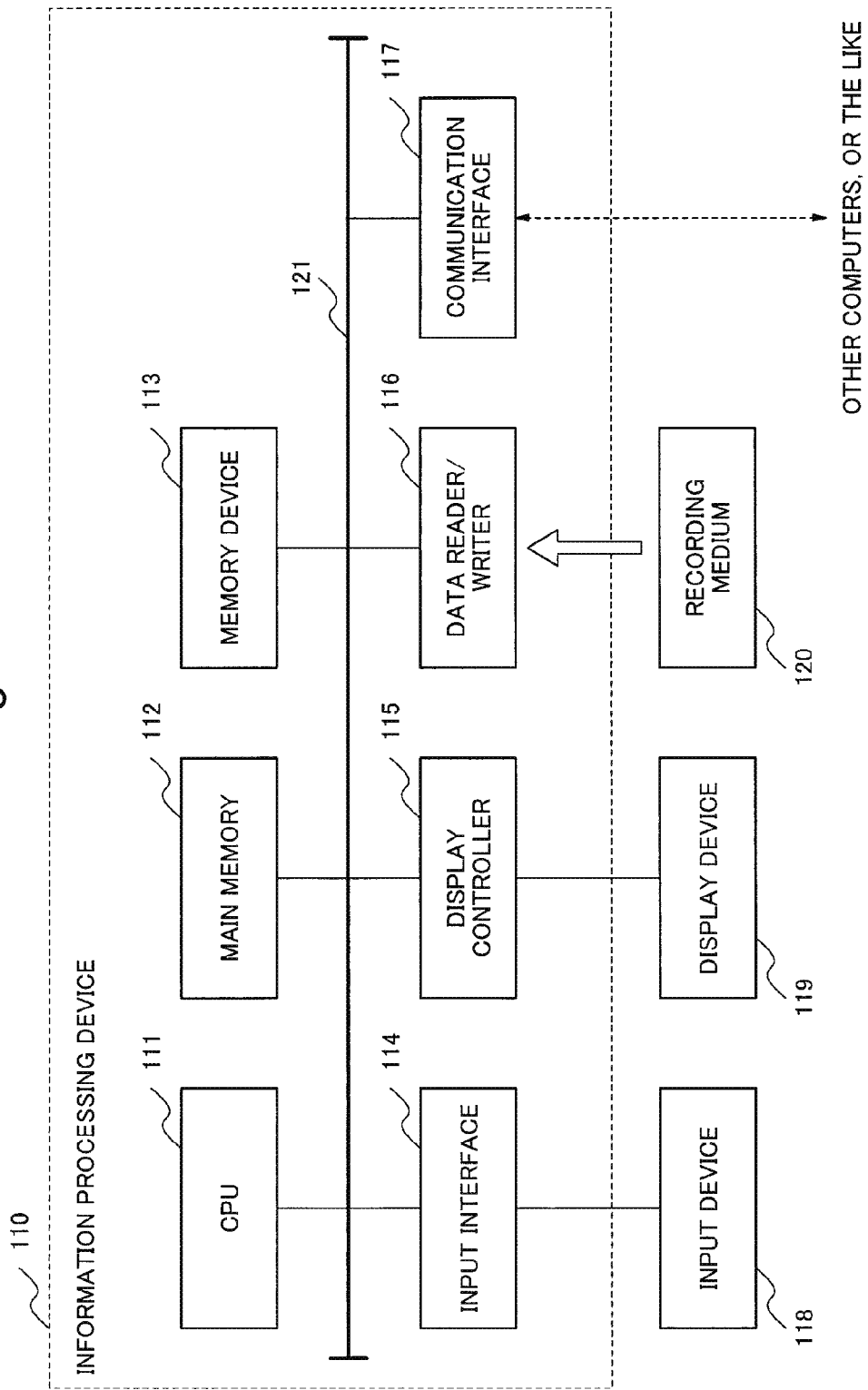
FIG. 7 is a block diagram showing an example of a computer which configures the region recommendation device according to the exemplary embodiments 1-3 of the present invention.

Further, as a specific example of a computer which executes the program indicated by the first to third exemplary embodiments, the computer shown in FIG. 7 is mentioned. FIG. 7 is a block diagram showing an example of the computer which configures the region recommendation device in the first to third exemplary embodiments of the present invention.

As shown in FIG. 7, the computer 110 includes a CPU 111, a main memory 112, a memory device 113, an input interface 114, a display controller 115, a data reader/writer 116 and a communication interface 117. Each of these parts is connected via a bus 121 so that it is possible to communicate data each other.

The CPU 111 spreads the program (codes) according to the exemplary embodiments stored in the memory device 113 to the main memory 112, and performs various operations by executing these in the predetermined order. The main memory 112 is, typically, a volatile memory device such as DRAM (Dynamic Random Access Memory). Further, the program according to the exemplary embodiments is provided by the state being stored in a computer-readable recording medium 120. Further, the program according to the exemplary embodiments may be the one which is circulated on the internet connected via the communication interface 117.

As a specific example of the memory device 113, a semiconductor memory device such as a flash memory other than a hard disk is mentioned. The input interface 114 mediates data transmission between the CPU 111 and the input device 118 such as a keyboard or a mouse. The display controller 115 is connected with a display unit 119, and controls display on the display unit 119.

The data reader/writer 116 mediates data transmission between the CPU 111 and the recording medium 120, and performs program reading from the recording medium 120 and writing processing results of the computer 110 to the recording medium 120. The communication interface 117 mediates data transmission between the CPU 111 and the other computers.

As a specific example of the recording medium 120, a general-purpose semiconductor storage device such as CF (Compact Flash) and SD (Secure Digital), a magnetic storage medium such as a flexible disc (Flexible Disk) or an optical storage medium of CD-ROM (Compact Disk Read Only Memory) or the like is mentioned.

Further, according to the first to third exemplary embodiments, although the region recommendation device is a different device from the information processing device 10, for example, it may be a situation such that the region recommendation device is assembled inside the information processing device 10. In this case, the program which configures the region recommendation device is included in a computer, a mobile terminal, a digital camera or the like which functions as the information processing device 10, and executed there.
Embodiment 1

Hereinafter, a specific embodiment of the region recommendation device and the region recommendation method according to the first exemplary embodiment will be described in detail with reference to FIGS. 8-11. Further, in below, with reference to FIG. 1, operation of the region recommendation device 100 will be described along the flow chart shown in FIG. 2. The "object" in an embodiment 1 means a region, among regions on the screen, where the selection operation such as a click is possible.

Figure 8:
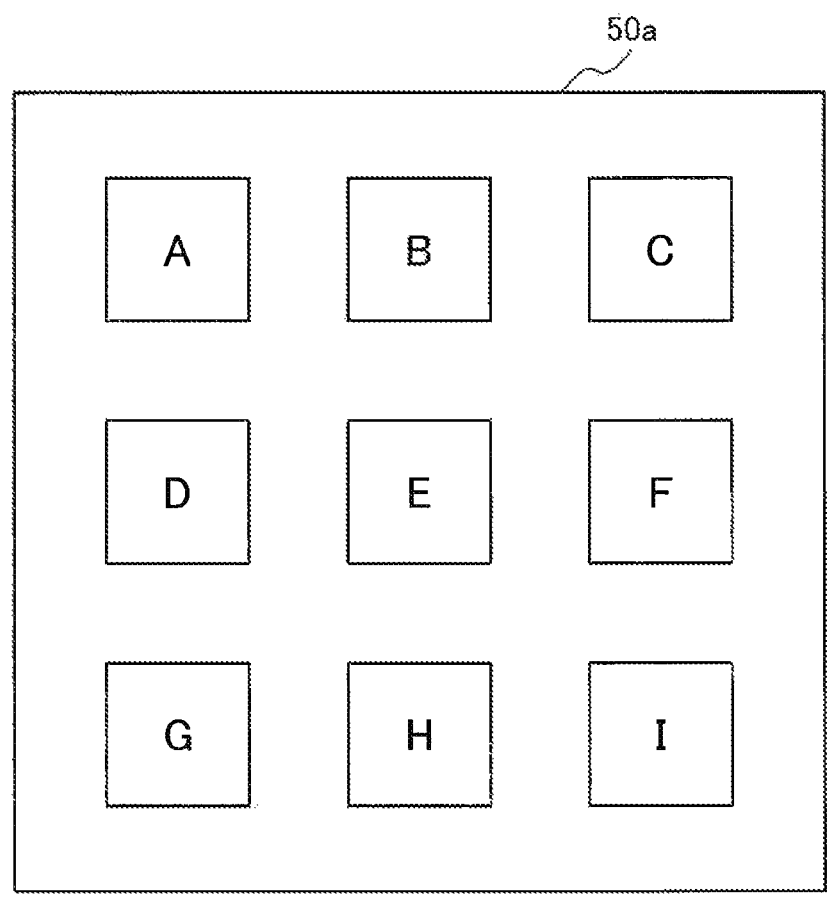
FIG. 8 is a figure showing an example of an operation screen shown on a display device in an embodiment 1.

FIG. 8 is a figure showing an example of the operation screen indicated on a display device in the embodiment 1. As shown in FIG. 8, in the embodiment 1, selectable objects A-I are placed and indicated on the screen 50a. Also, in the embodiment 1, it is supposed that an operator needs to select the object F in order to achieve a certain specific task. Moreover, in the embodiment 1, the viewing order information, the selection possibility information and information which identifies a selection target object are the ones for a certain specific task, and are stored in the memory unit 108 in advance.
[Step S101]

First, the visibility analysis unit 101 acquires the viewing order information shown in FIG. 9 from the memory unit 108. FIG. 9 shows an example of the viewing order information used in the embodiment 1. As shown in FIG. 9, in the embodiment 1, the viewing order information includes average viewing rank for each object. The region recommendation device 100 acquires, in advance, whenever the operator visits a target screen, the viewing rank of each object, and can calculate the average viewing rank for each object by dividing the sum of the viewing rank by the visit number of times. Moreover, the region recommendation device 100 can acquire the viewing rank, for example, by detecting reflected light of the light applied to the operator's pupil using the device of detecting a movement of a pupil (the eye tracking device).

Further, in the embodiment 1, the viewing order information is not limited to the example shown in FIG. 9. For example, the region recommendation device 100 gives a score to each object according to the viewing rank whenever the operator visits the target screen, and may use the sum of this score for each object as the viewing order information.

Moreover, although the value calculated from the actual visual recognition history is used as the viewing order information in the example shown in FIG. 9, the viewing order information, in the embodiment 1, is not limited to this. For example, the viewing order information may be found by the viewing rank which is predicted for each object placed on the target screen.

Further, in the example shown in FIG. 9, the viewing order information includes the viewing rank of each object. However, in the embodiment 1, it is not limited to this. The viewing order information may be composed of the viewing order with respect to a region which does not compose the object on the screen.

Next, the visibility analysis unit 101 identifies the frequent viewing region using the viewing order information shown in FIG. 9 or the other viewing order information mentioned above, and extracts this. Specifically, the visibility analysis unit 101 extracts, from the viewing order information shown in FIG. 9, the objects A-E whose viewing order is earlier than the object F (average viewing order=5.67) which should be selected in order to achieve a task. And, the visibility analysis unit 101 transmits ID information which identifies these objects A-F to the selection possibility analysis unit 102 and the recommended-region identification unit 103.

In the embodiment 1, the visibility analysis unit 101 can identify the object whose average viewing order is not earlier than the object (selection target object) which should be selected in order to achieve a task as the frequent viewing region. In other words, the visibility analysis unit 101 can also identify as the frequent viewing region together with the object whose average viewing order is late within the range set in advance. For example, it may set the condition such that the object whose average viewing order is later than the selection target object can be identified as the frequent viewing region as long as the average viewing order is within 1.00. In this case, the visibility analysis unit 101 also identifies the object G (average viewing order =6.01) which has the difference of 0.34 in the average viewing order with the object F as the frequent viewing region, and extracts this.
[Step S102]

Figure 10:
FIG. 10 indicates an example of the selection possibility information used in the embodiment 1.

Next, the selection possibility analysis unit 102 acquires the selection possibility information shown in FIG. 10 from the memory unit 108. FIG. 10 shows an example of the selection possibility information used in the embodiment 1. As shown in FIG. 10, in the embodiment 1, the selection possibility information is composed of a ratio, for each object, of the number of times which the object has been selected by a click or the like to the number of times which the operator has viewed the target screen, in other words selection probability of each object.

Further, in the embodiment 1, the selection possibility information may be information besides the example shown in FIG. 10. For example, the selection possibility information may be composed of, for each object, the semantic relation (degree of relation) between the contents of a task associated with the object and the text indicated to the object.

Next, the selection possibility analysis unit 102 identifies the objects A-E based on the ID information transmitted from the visibility analysis unit 101 in Step S101. And, the selection possibility analysis unit 102 refers to the selection possibility information shown in FIG. 10, and identifies the frequent selection object from the objects A-E. Specifically, the selection possibility analysis unit 102 identifies the object D (selection probability=0.30) which has a higher selection probability than the selection target object F (selection probability=0.22), and extracts this. Moreover, the selection possibility analysis unit 102 transmits the ID information which identifies the extracted object D to the recommended-region identification unit 103.

Further, in the embodiment 1, the selection possibility analysis unit 102 can identify the object which does not have a higher selection possibility than the selection target object as the frequent selection object. In other words, the selection possibility analysis unit 102 may also identify as the frequent selection object together with the object with a low selection probability within the range set in advance. For example, it may set the condition such that even if the object whose selection probability is lower than the selection target object, it is identified as the frequent selection object as long as the selection probability is within 0.05. In this case, the selection possibility analysis unit 102 also identifies the object C (0.18) which has the difference of 0.04 in the selection probability with the object F as the frequent selection object, and extracts this.

Moreover, in the embodiment 1, the selection possibility analysis unit 102 makes it a condition that the value representing selection possibility, for example the selection probability, is higher than a predetermined threshold value, and can also identify all objects which satisfy the condition as the frequent selection object. For example, it may set the condition that the object including the selection probability higher than 0.15 is extracted as the frequent selection object. In this case, the selection possibility analysis unit 102 identifies the object C (selection probability=0.18) and the object D (selection probability=0.25) as the frequent selection object, and extracts these.

[Step S103]

Next, the recommended-region identification unit 103 identifies the object D as the frequent selection object based on the ID information transmitted from the selection possibility analysis unit 102 in Step S102. And, the recommended-region identification unit 103 searches for an object having the average viewing order earlier than the object D using the viewing order information shown in FIG. 9. In this embodiment 1, the average viewing orders of the object A (average viewing order=1.83) and the object B (average viewing order =2.96) are earlier than the average viewing order of the object D (average viewing order=4.03). Accordingly, the recommended-region identification unit 103 identifies the object A and the object B as the recommended-region, and extracts these.

In the embodiment 1, the recommended-region identification unit 103 can identify the object including the average viewing order which is not earlier than the frequent selection object as the recommended-region. In other words, the recommended-region identification unit 103 can also identify as the recommended-region together with the object whose average viewing order is late within the range set in advance. For example, it may set the condition such that even if the object whose average viewing order is later than the frequent selection object, it is identified as the recommended-region as long as the average viewing order is within 1.00. In this case, the recommended-region identification unit 103 also identifies the object C (average viewing order=4.65) which has the difference of 0.62 in the average viewing order with the object D (frequent selection object) as the recommended-region, and extracts this.

Further, in the embodiment 1, the recommended-region identification unit 103 can identify the region on the screen besides selectable objects as the recommended-region. In other words, the recommended-region identification unit 103 can extract the region whose average viewing order is earlier than the frequent selection object identified by the selection possibility analysis unit 102 as the recommended-region from among all regions on the screen.

[Step S104]

Figure 11:
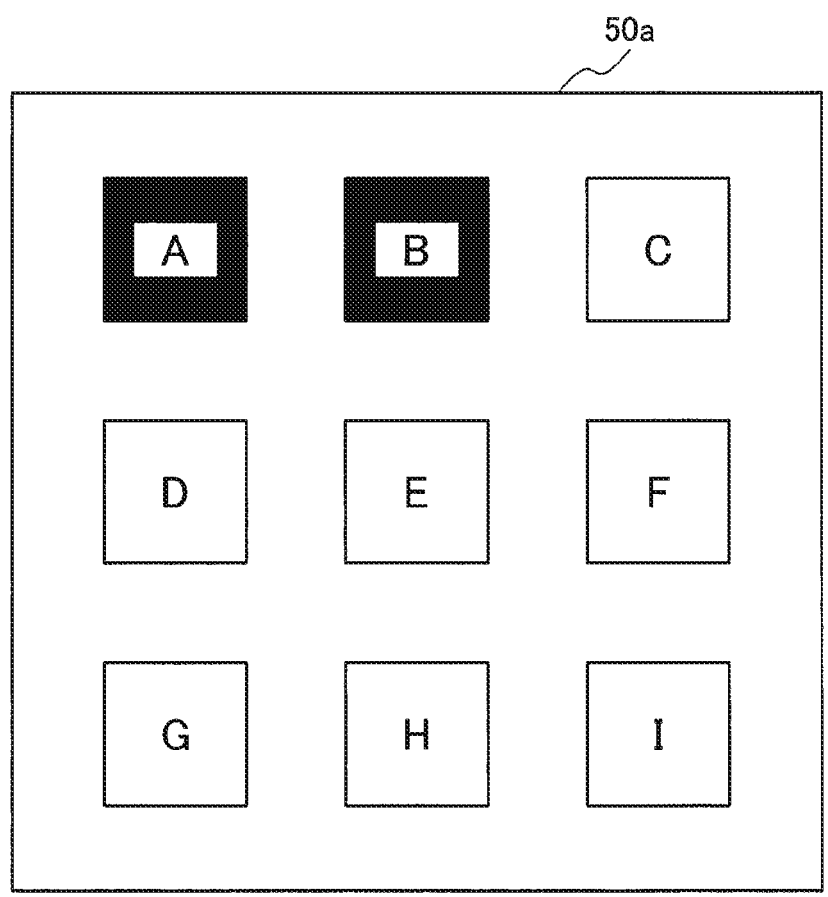
FIG. 11 is a figure showing an example of a screen on which a recommended-region is being indicated in the embodiment 1.

Next, the recommended-region identification unit 103 outputs the ID information which identifies the object A and the object B to the data processing unit 30 of the information processing device 10 (refer to FIG. 1). And, in the embodiment 1, as shown in FIG. 11, the data processing unit 30 of the information processing device 10 highlights the object A and the object B on the screen 50*a* via the output unit 40. In the example of FIG. 11, the region in which the object A is placed, and the region in which the object B is placed are colored with a color that can be obtained by reversing the color of the surrounding region. FIG. 11 is a figure showing an example of the screen indicating the recommended-region in the embodiment 1.

Further, in the embodiment 1, a method for highlighting the recommended-region is not limited in particular. For example, instead of indicating the recommended-region graphically, the information processing device 10 can indicate it by the text. Moreover, as stated in the description of Step S103, when the recommended-region identification unit 103 has identified the region besides the selectable objects as the recommended-region, the region besides these selectable objects is highlighted on the screen 50*a*.

Moreover, in the embodiment 1, it may indicate information relating to the recommended-region, for example, the viewing rank, the object ID or the like together with the recommended-region on the screen 50*a*. In this case, because a designer of the GUI can recognize which object is visually recognized and how earlier, further improvement of the usability can be achieved.

Embodiment 2

Next, a specific embodiment of the region recommendation device and the region recommendation method according to the second exemplary embodiment will be described in detail with reference to FIG. 12. In below, with reference to FIG. 3, operation of the region recommendation device 200 will be described along the flow chart shown in FIG. 4. Moreover, also in an embodiment 2, it is supposed that the selectable objects A-I are placed and indicated on the screen 50*a* as shown in FIG. 8 similar to the embodiment 1. Also, it is supposed that an operator needs to select the object F in order to achieve a certain specific task. However, in this embodiment 2, it is different from the embodiment 1 that only the viewing order information is stored in the memory unit 108 in advance.

[Step S201]

First, the measuring unit 104 accesses the data processing unit 30 (refer to FIG. 3) of the information processing device 10, and measures the viewing number of times and the selection frequency for each object on the screen when being viewed. FIG. 12 indicates the selection frequency for each object measured in the embodiment 2.

[Step S202]

Next, the selection possibility information generation unit 105 calculates the selection probability for each object using the viewing number of times and the selection frequency measured in Step S201. Further, the selection probability calculated in the embodiment 2 is the same one as the selection probability shown in FIG. 10 in the embodiment 1, and is a ratio of the selection frequency to the viewing number of times.

[Steps S203-S206]

After that, Steps S203-S206 are performed. However, Steps S203-S206 are performed similar to Steps S101-S104 shown in the embodiment 1 except that the selection probability calculated in Step S201 is used in Step S204.

Embodiment 3

Figure 13:
FIG. 13 indicates viewing order for each object acquired in an embodiment 3.
Figure 14:
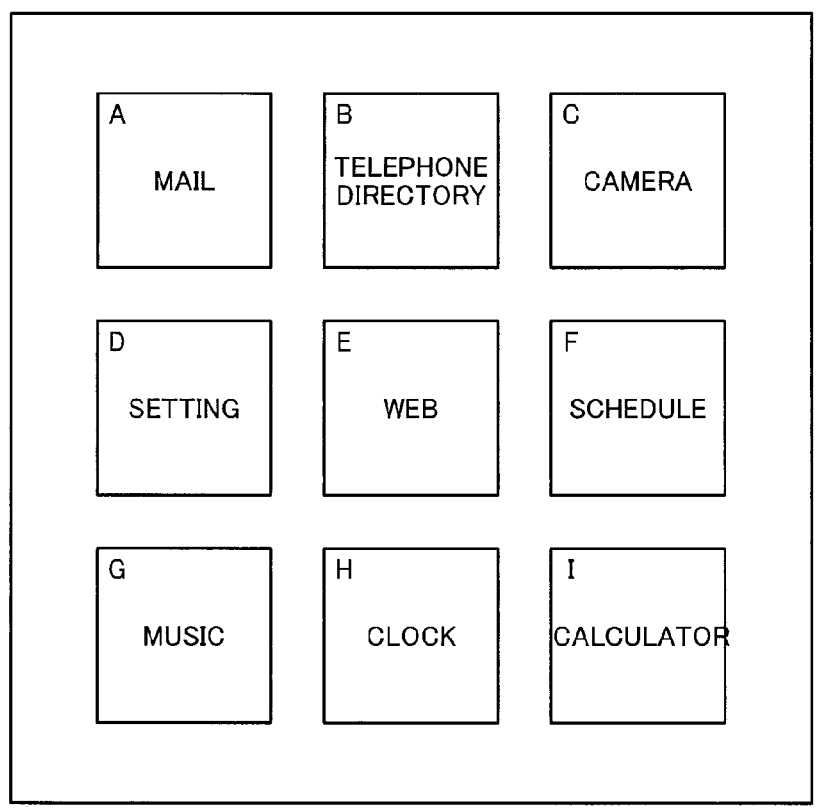
FIG. 14 is a figure showing an example of a menu screen of a cellular phone in related art.

Next, a specific embodiment of the region recommendation device and the region recommendation method according to the third exemplary embodiment will be described in detail with reference to FIG. 13. Further, in below, with reference to FIG. 5, operation of the region recommendation device 300 will be described along the flow chart shown in FIG. 6. Moreover, also in an embodiment 3, it is supposed that the selectable objects A-I are placed and indicated on the screen 50*a* as shown in FIG. 8 similar to the embodiment 1. Also, it is supposed that an operator needs to select the object F in order to achieve a certain specific task. However, in the embodiment 3, it is different from the embodiment 1 that only the selection possibility information is stored in the memory unit 108 in advance.

[Step S301]

First, whenever the operator views the screen, the viewing rank acquisition unit 106 operates the eye tracking device (not shown), and acquires the viewing rank of each object. In the embodiment 3, the number of times of acquiring the viewing rank is set to 100 times. FIG. 13 indicates the viewing ranks for each object acquired in the embodiment 3. In FIG. 13, trial 1, trial 2, - - - trial 100 indicate each of viewing times, and each column indicates the viewing rank of each object for each viewing time.

Further, in the embodiment 3, the viewing rank acquisition unit 106 sets the rank to the object which was not visually recognized consequently because other object had been selected before visually recognized, and can acquire its rank. Specifically, the viewing rank acquisition unit 106 can set the rank of the object which was not visually recognized next to the rank of the object visually recognized lastly. Further, setting of the viewing rank to such object which was not visually recognized is not limited in particular.

Moreover, in the embodiment 3, when there is an object visually recognized a plurality of times in one time screen viewing by the operator, the viewing rank acquisition unit 106 can adopt the first viewing rank as the viewing rank of this object. Further, setting of the viewing rank to such object visually recognized a plurality of times is not limited in particular.

[Step S302]

Next, the viewing order information generation unit 107 finds the average viewing rank for each object using the viewing ranks of all 100 times of each object acquired in Step S101. And, the viewing order information generation unit 107 puts each of the found average viewing ranks together and generates the viewing order information. Further, the average viewing rank calculated in the embodiment 3 is similar to the average viewing rank shown in FIG. 9 in the embodiment 1.

Further, in the embodiment 3, the viewing order information generation unit 107 can generate the viewing order information using information besides the average viewing rank. For example, the viewing order information generation unit 107 adds a score such as 10 points, 5 points, 2 points to the respective objects of the first rank to the third rank of viewing rank in each trial shown in FIG. 13, and calculates the total score of all trials for each object. And, the viewing order information generation unit 107 may make the viewing order information by putting the total score of each object all together.

Moreover, in the above-mentioned example, the viewing rank acquisition unit 106 and the viewing order information generation unit 107 are dealing with the viewing order for each selectable object on the screen as mentioned above, however, the embodiment 3 is not limited to this. In the embodiment 3, the viewing rank acquisition unit 106 and the viewing order information generation unit 107 may deal with the viewing order about the region besides the objects on the screen.

One of the effects of the present invention is that it can identify, on the screen, a position where it is highly likely that an operator selects an object, and achieve improvement of usability of the GUI.

This application claims priority from Japanese Patent Application No. 2010-127512, filed on Jun. 3, 2010, the contents of which are incorporation herein by reference in their entirety.

The whole or part of the exemplary embodiments and the embodiments disclosed above can be described as, but not limited to, the following supplementary notes.

(Supplementary Note 1)

A region recommendation device comprising:

a visibility analysis unit which identifies, based on viewing order of a region on a screen, from among regions besides the region in which a target object is placed, the region where the viewing order satisfies a set criterion as a frequent viewing region;

a selection possibility analysis unit which identifies, based on selection possibility of each object on the screen, from among objects placed on the frequent viewing region, the object which the selection possibility satisfies a set criterion as a frequent selection object; and a recommended-region identification unit which identifies, based on the viewing order, from among regions besides the region in which the frequent selection object is placed in the frequent viewing region, the region which is suitable for placing the target object as a recommended-region.

(Supplementary Note 2)

The region recommendation device according to supplementary note 1, wherein the selection possibility analysis unit identifies the object which the selection possibility is higher than the target object as the frequent selection object.

(Supplementary Note 3)

The region recommendation device according to supplementary note 1 or 2, wherein the visibility analysis unit identifies the region where the viewing order is earlier than the target object as the frequent viewing region, and the recommended-region identification unit identifies the region where the viewing order is earlier than the region in which the frequent selection object is placed in the frequent viewing region as the recommended-region.

(Supplementary Note 4)

The region recommendation device according to any one of supplementary notes 1-3, wherein the selection possibility of each object on the screen is found by a ratio of a selection frequency of the object to a viewing number of times of the screen.

(Supplementary Note 5)

The region recommendation device according to supplementary note 4, further comprising:

a measuring unit which measures the viewing number of times of the screen and the selection frequency of the object for each object on the screen; and a selection possibility information generation unit which performs the statistical processing to the viewing number of times of the screen and the selection frequency of the object for each object on the screen that the measuring unit has measured, and generates information for identifying the selection possibility of each object on the screen based on a result of the statistical processing, and wherein the selection possibility analysis unit identifies the frequent selection object using the information generated by the selection information generation unit.

(Supplementary Note 6)

The region recommendation device according to any one of supplementary notes 1-3, wherein each object on the screen is associated with a task which is executed outside the region recommendation device, and the selection possibility of each object on the screen is found by the semantic relation between contents of the task which is associated with the object and the text shown to the object.

(Supplementary Note 7)

The region recommendation device according to any one of supplementary notes 1-6, wherein the viewing order of the region on the screen is found by viewing rank, which is detected whenever the screen is viewed, for each of a plurality of parts which compose the screen.

(Supplementary Note 8)

The region recommendation device according to any one of supplementary notes 1-6, wherein the viewing order of the region on the screen is found by a predicted viewing rank for each of a plurality of parts which compose the screen.

(Supplementary Note 9)

The region recommendation device according to supplementary note 7, further comprising:

a viewing rank acquisition unit which acquires the viewing rank for each of the plurality of parts whenever the screen is viewed; and viewing order information generation unit which performs the statistical processing to the viewing rank for each of the plurality of parts acquired by the viewing rank acquisition unit, and generates information for identifying the viewing order of the region on the screen based on a result of the statistical processing, and wherein the visibility analysis unit identifies the frequent viewing region using the information generated by the viewing order information generation unit, and the recommended-region identification unit identifies the recommended-region using the information generated by the viewing order information generation unit.

Supplementary Note 10)

The region recommendation device according to any one of supplementary notes 1-9, wherein the visibility analysis unit identifies the objects besides the target object as the frequent viewing regions, and the recommended-region identification unit identifies the object to become the recommended-region from among the objects identified as the frequent viewing regions.

(Supplementary Note 11)

A region recommendation method comprising:

(a) a step of identifying, based on viewing order of a region on a screen, from among regions besides the region in which a target object is placed, the region where the viewing order satisfies a set criterion as a frequent viewing region;

(b) a step of identifying, based on selection possibility of each object on the screen, from among objects placed on the frequent viewing region, the object which the selection possibility satisfies a set criterion as a frequent selection object; and (c) a step of identifying, based on the viewing order, from among regions besides the region in which the frequent selection object is placed in the frequent viewing region, the region which is suitable for placing the target object as a recommended-region.

(Supplementary Note 12)

The region recommendation method according to supplementary note 11, wherein in the step (b), the object which the selection possibility is higher than the target object is identified as the frequent selection object.

(Supplementary Note 13)

The region recommendation method according to supplementary note 11 or 12, wherein, in the step (a), the region where the viewing order is earlier than the target object is identified as the frequent viewing region, and in the step (c), the region where the viewing order is earlier than the region in which the frequent selection object is placed in the frequent viewing region is identified as the recommended-region.

(Supplementary Note 14)

The region recommendation method according to any one of supplementary notes 11-13, wherein the selection possibility of each object on the screen is found by a ratio of a selection frequency of the object to a viewing number of times of the screen.

(Supplementary Note 15)

The region recommendation method according to supplementary note 14, further comprising:

(d) a step of measuring the viewing number of times of the screen and the selection frequency of the object for each object on the screen; and (e) a step of performing the statistical processing to the viewing number of times of the screen and the selection frequency of the object for each object on the screen measured in the step (d), and generating information for identifying the selection possibility of each object on the screen based on a result of the statistical processing, and wherein, in the step (b), identifying the frequent selection object using the information generated in the step (e).

(Supplementary Note 16)

The region recommendation method according to any one of supplementary notes 11-13, wherein each object on the screen is associated with a task which is executed outside the region recommendation device, and the selection possibility of each object on the screen is found by the semantic relation between contents of the task which is associated with the object and the text shown to the object.

(Supplementary Note 17)

The region recommendation method according to any one of supplementary notes 11-16, wherein the viewing order of the region on the screen is found by viewing rank, which is detected whenever the screen is viewed, for each of a plurality of parts which compose the screen.

(Supplementary Note 18)

The region recommendation method according to any one of supplementary notes 11-16, wherein the viewing order of the region on the screen is found by a predicted viewing rank for each of a plurality of parts which compose the screen.

(Supplementary Note 19)

The region recommendation method according to supplementary note 17, further comprising:

(f) a step of acquiring the viewing rank for each of the plurality of parts whenever the screen is viewed; and (g) a step of performing the statistical processing to the viewing rank for each of the plurality of parts acquired in the step (f), and generating information for identifying the viewing order of the region on the screen based on a result of the statistical processing, and Wherein, in the step (a), identifying the frequent viewing region using the information generated in the step (g), and in the step (c), identifying the recommended-region using the information generated in the step (g).

(Supplementary Note 20)

The region recommendation method according to any one of supplementary notes 11-19, wherein in the step (a), identifying the objects besides the target object as the frequent viewing regions, and in the step (c), identifying the object to become the recommended-region from among the objects identified as the frequent viewing regions.

(Supplementary Note 21)

A program, when executed by a computer, characterized by causing the computer to perform the following steps:

(a) a step of identifying, based on viewing order of a region on a screen, from among regions besides the region in which a target object is placed, the region where the viewing order satisfies a set criterion as a frequent viewing region;

(b) a step of identifying, based on selection possibility of each object on the screen, from among objects placed on the frequent viewing region, the object which the selection possibility satisfies a set criterion as a frequent selection object; and (c) a step of identifying, based on the viewing order, from among regions besides the region in which the frequent selection object is placed in the frequent viewing region, the region which is suitable for placing the target object as a recommended-region.

(Supplementary Note 22)

The program according to supplementary note 21, wherein, in the step (b), the object which the selection possibility is higher than the target object is identified as the frequent selection object.

(Supplementary Note 23)

The program according to supplementary note 21 or 22, wherein, in the step (a), the region where the viewing order is earlier than the target object is identified as the frequent viewing region, and in the step (c), the region where the viewing order is earlier than the region in which the frequent selection object is placed in the frequent viewing region is identified as the recommended-region.

(Supplementary Note 24)

The program according to any one of supplementary notes 21-23, wherein the selection possibility of each object on the screen is found by a ratio of a selection frequency of the object to a viewing number of times of the screen.

(Supplementary Note 25)

The program according to supplementary note 24, further causing the computer to perform:

(d) a step of measuring the viewing number of times of the screen and the selection frequency of the object for each object on the screen; and (e) a step of performing the statistical processing to the viewing number of times of the screen and the selection frequency of the object for each object on the screen measured in the step (d), and generating information for identifying the selection possibility of each object on the screen based on a result of the statistical processing, and wherein, in the step (b), identifying the frequent selection object using the information generated in the step (e).

(Supplementary Note 26)

The program according to any one of supplementary notes 21-23, wherein each object on the screen is associated with a task which is executed outside the region recommendation device, and the selection possibility of each object on the screen is found by the semantic relation between contents of the task which is associated with the object and the text shown to the object.

(Supplementary Note 27)

The program according to any one of supplementary notes 21-26, wherein the viewing order of the region on the screen is found by viewing rank, which is detected whenever the screen is viewed, for each of a plurality of parts which compose the screen.

(Supplementary Note 28)

The program according to any one of supplementary notes 21-26, wherein the viewing order of the region on the screen is found by a predicted viewing rank for each of a plurality of parts which compose the screen.

(Supplementary Note 29)

The program according to supplementary note 27, further causing the computer to perform:

(f) a step of acquiring the viewing rank for each of the plurality of parts whenever the screen is viewed; and (g) a step of performing the statistical processing to the viewing rank for each of the plurality of parts acquired in the step (f), and generating information for identifying the viewing order of the region on the screen based on a result of the statistical processing, and wherein, in the step (a), identifying the frequent viewing region using the information generated in the step (g), and in the step (c), identifying the recommended-region using the information generated in the step (g).

(Supplementary Note 30)

The program according to any one of supplementary notes 21-29, wherein in the step (a), identifying the objects besides the target object as the frequent viewing regions, and in the step (c), identifying the object to become the recommended-region from among the objects identified as the frequent viewing regions.

INDUSTRIAL APPLICABILITY

According to the present invention, it can identify, on the screen of the GUI, a position where it is highly likely that an operator selects an object, and can achieve improvement of usability of the GUI. The present invention can be applied to, for example, the use for evaluating the GUI of a system or the like.

DESCRIPTION OF THE CODES

10 information processing device (first exemplary embodiment)
20 input unit
30 data processing unit
40 output unit
50 display device
50a screen
100 region recommendation device (first exemplary embodiment)
101 visibility analysis unit
102 selection possibility analysis unit
103 recommended-region identification unit 104 measuring unit
105 selection possibility information generation unit
106 viewing rank acquisition unit
107 viewing order information generation unit
108 memory unit
110 computer
111 CPU
112 main memory
113 memory device
114 input interface
115 display controller
116 data reader/writer
117 communication interface
118 input device
119 display device
120 recording medium
121 bus
200 region recommendation device (second exemplary embodiment)
300 region recommendation device (third exemplary embodiment)

The invention claimed is:

1. A region recommendation device comprising:
a visibility analysis unit implemented by a programmed processor and configured to identify, based on a viewing order of a region on a screen, from among regions other than the region in which a user identified target object is placed, at least one region where the viewing order satisfies a set criterion as a frequent viewing region, wherein the frequent viewing region is identified to have an earlier viewing order than the region in which the target object is placed;
a selection probability analysis unit implemented by a programmed processor and configured to identify, based on a selection probability of each object on the screen, from among objects placed on the frequent viewing region, at least one object of which the selection probability satisfies a set criterion as a frequent selection object, wherein the frequent selection object is identified to have a higher selection probability than the target object; and
a recommended-region identification unit implemented by a programmed processor and configured to identify, based on the viewing order, from among regions other than the region in which the frequent selection object is placed in the frequent viewing region, a suitable region for placing the target object as a recommended-region, wherein the recommended-region is identified to have a viewing order that is earlier than the region in which the frequent selection object is placed.

2. The region recommendation device according to claim 1, wherein
the selection probability of each object on the screen is found by a ratio of a selection frequency of the object to a number of times viewed on the screen.

3. The region recommendation device according to claim 2, further comprising:
a measuring unit implemented by a programmed processor and configured to measure the viewing number of times of the screen and the selection frequency of the object for each object on the screen; and
a selection probability information generation unit implemented by a programmed processor and configured to perform the statistical processing to the viewing number of times of the screen and the selection frequency of the object for each object on the screen that the measuring unit has measured, and generates information for identifying the selection probability of each object on the screen based on a result of the statistical processing, and
wherein the selection probability analysis unit identifies the frequent selection object using the information generated by the selection probability information generation unit.

4. The region recommendation device according to claim 1, wherein
the viewing order of the region on the screen is found by viewing rank, which is detected whenever the screen is viewed, for each of a plurality of parts which compose the screen.

5. The region recommendation device according to claim 4, further comprising:
a viewing rank acquisition unit implemented by a programmed processor and configured to acquire the viewing rank for each of the plurality of parts whenever the screen is viewed; and
viewing order information generation unit implemented by a programmed processor and configured to perform the statistical processing to the viewing rank for each of the plurality of parts acquired by the viewing rank acquisition unit, and generates information for identifying the viewing order of the region on the screen based on a result of the statistical processing, and
wherein the visibility analysis unit identifies the frequent viewing region using the information generated by the viewing order information generation unit, and the recommended-region identification unit identifies the recommended-region using the information generated by the viewing order information generation unit.

6. A region recommendation method comprising:
identifying, based on a viewing order of a region on a screen, from among regions other than the region in which a user identified target object is placed, at least one region where the viewing order satisfies a set criterion as a frequent viewing region, wherein the frequent viewing region is identified to have an earlier viewing order than the region in which the target object is placed;
identifying, based on a selection probability of each object on the screen, from among objects placed on the frequent viewing region, at least one object of which the selection probability satisfies a set criterion as a frequent selection object, wherein the frequent selection object is identified to have a higher selection probability than the target object; and
identifying, based on the viewing order, from among regions other than the region in which the frequent selection object is placed in the frequent viewing region, a suitable region for placing the target object as a recommended-region, wherein the recommended-region is identified to have a viewing order that is earlier than the region in which the frequent selection object is placed.

7. A non-transitory computer-readable medium storing a program for causing a computer to perform:
processing for identifying, based on a viewing order of a region on a screen, from among regions other than the region in which a user identified target object is placed, at least one region where the viewing order satisfies a set criterion as a frequent viewing region, wherein the frequent viewing region is identified to have an earlier viewing order than the region in which the target object is placed;
processing for identifying, based on a selection probability of each object on the screen, from among objects placed on the frequent viewing region, at least one object of which the selection probability satisfies a set criterion as a frequent selection object, wherein the frequent selection object is identified to have a higher selection probability than the target object; and processing for identifying, based on the viewing order, from among regions other than the region in which the frequent selection object is placed in the frequent viewing region, a suitable region for placing the target object as a recommended-region, wherein the recommended-region is identified to have a viewing order that is earlier than the region in which the frequent selection object is placed.

* * * * *